(12) United States Patent
Fishman

(10) Patent No.: US 7,512,192 B2
(45) Date of Patent: Mar. 31, 2009

(54) PHASE CONJUGATED VECTORING OF SIGNALS IN TELEPHONE CABLES

(76) Inventor: Ilya M. Fishman, 558 Cambridge Ave., Palo Alto, CA (US) 94306

( * ) Notice: Subject to any disclaimer, the term of this patent is extended or adjusted under 35 U.S.C. 154(b) by 775 days.

(21) Appl. No.: 10/775,380

(22) Filed: Feb. 10, 2004

(65) Prior Publication Data

US 2004/0157566 A1 Aug. 12, 2004

(51) Int. Cl.
*H04K 1/02* (2006.01)

(52) U.S. Cl. ............... 375/296; 375/295; 455/91; 370/201; 370/203; 370/515; 370/528; 370/367; 327/291; 332/106; 341/20; 341/173

(58) Field of Classification Search ......... 375/257, 375/259, 354; 370/515, 528, 367, 201, 203; 327/291; 332/106; 341/20, 173
See application file for complete search history.

(56) References Cited

U.S. PATENT DOCUMENTS

| | | | | |
|---|---|---|---|---|
| 5,031,234 A | * | 7/1991 | Primas et al. ............... | 398/154 |
| 5,493,691 A | * | 2/1996 | Barrett .................... | 455/20 |
| 5,887,032 A | * | 3/1999 | Cioffi ..................... | 375/257 |
| 6,134,283 A | * | 10/2000 | Sands et al. ................ | 375/354 |
| 6,266,347 B1 | * | 7/2001 | Amrany et al. .............. | 370/478 |
| 6,965,649 B1 | * | 11/2005 | Miyoshi et al. .............. | 375/259 |
| 6,999,504 B1 | * | 2/2006 | Amrany et al. .............. | 375/222 |
| 7,126,995 B2 | * | 10/2006 | Miyoshi et al. .............. | 375/259 |
| 7,149,254 B2 | * | 12/2006 | Sampath .................. | 375/267 |
| 7,173,984 B2 | * | 2/2007 | Miyoshi et al. .............. | 375/340 |
| 2004/0019443 A1 | * | 1/2004 | Jones et al. ................ | 702/79 |
| 2004/0114751 A1 | * | 6/2004 | Tomilson ............... | 379/399.01 |
| 2005/0259991 A1 | * | 11/2005 | Dudelzak et al. ........... | 398/118 |
| 2006/0109779 A1 | * | 5/2006 | Shah et al. ................. | 370/201 |

\* cited by examiner

*Primary Examiner*—Shuwang Liu
*Assistant Examiner*—Helene Tayong
(74) *Attorney, Agent, or Firm*—Bella Fishman (57) ABSTRACT

A phase conjugation vectoring (PCV) of signals propagating in telephone cables of twisted pairs provides crosstalk free transmission therethrough. The cable is considered a non-uniform physical media, and criteria for phase conjugation of electromagnetic fields are established. Method and system provide PCV for both asymmetric and symmetric transmission.

18 Claims, 5 Drawing Sheets

Prior Art

PHASE CONJUGATED VECTORING OF SIGNALS IN TELEPHONE CABLES

FIELD OF THE INVENTION

This invention in general relates to transmission of radio frequency signals (in MHz range) through telephone cables, and in particular, to systems and methods improving broadband transmission through multiple twisted pair wires interacting with each other.

BACKGROUND OF THE INVENTION

Currently deployed systems and methods developed for transmission of signals through copper twisted pairs were initially dedicated to low-speed (64 KBits/sec) telephone services. To provide telephone service, the US territory is divided into a plurality of service areas known as Customer Service Areas (CSAs) of specific dimensions. For example, with 24-gauge twisted pair wiring, maximum distance of 4 miles between a Central Office (CO) and customer premises is typical for the U.S. This distance limitation is defined by signal attenuation and channel-to-channel crosstalk in twisted pair cables.

Before Internet development, an idea of transmitting video over twisted pairs was extensively explored. Recently, twisted pair telephone cables were utilized for Internet connections with the bit rate of the order of 1 MBits/sec and faster. DSL technology and its versions (ADSL, VDSL) were developed to meet technical requirements of different applications. DSL modems became conventional devices for Internet connection used by businesses and households in the USA and other countries. However technical specifications of existing copper networks originally formulated for narrow band telephone connections create technical problems and constrains for Internet applications.

Twisted pair cables are characterized by frequency dependent power loss, phase delay and interference noise, especially pronounced at high frequencies. Substantial power loss (attenuation) and crosstalk accumulation as a function of frequency is observed even at low frequencies of several KHz, and above 600 KHz signal power level becomes lower than crosstalk making signal transmission difficult [for example, J. A. C. Bingham, "ADSL, VDSL, and Multicarrier Modulation", John Wiley and Sons, Inc., 2000, pp.29, 48, 49]. To take care of signal power loss and distortions, Discrete Multi-Tone (DMI) transmission format was developed initially for voice service (for example, U.S. Pat. No. 4,731, 816), and later applied to DSL transmission (for example, U.S. Pat. No. 5,673,290). In DMT format, spectrum is sliced in many narrow slots, with attenuation and dispersion almost constant within the slot. In each slot, a carrier frequency source is provided. The presently accepted and standardized Asymmetric Digital Subscriber Line transmits data using DMT scheme with 256 tones (frequency slots) each 4.3125 kHz wide, full frequency range being 1.104 MHz Bit stream of rate b is converted into several parallel symbols which are applied to modulate a discrete set of tones, then Fourier-transformed into time-domain samples, passed through P/S converter and sent through the transmission line as a time-dependent waveform. Quadrature Amplitude Modulation (QAM) is applied to the carrier wave in each frequency slot; both number of bits and transmitted power may be optimized depending on carrier wave attenuation and phase shift in a given slot. On the receiving end, signal amplitude and phase in each frequency slot is individually equalized, and other procedures are applied in the inverse order.

Though the improvements achieved by DMT systems are very substantial high frequency services provided in the field commonly does not cover more than 50% of CSA. In all practical applications, bandwidth was "traded" for distance. Today, ADSL service (1.5 MBits/sec) may be delivered over 12,000 ft, which is substantially less than maximum distance across CSA. Limitations of copper cables are even more pronounced for bit rates higher than 1.5 MBits/sec. A wide variety of business applications requires transmission rates of 25 MBits/sec or 50 MBits/sec. These kind of signals may be transmitted through twisted pairs only at very short distances (less than 1,000 ft at 100 Mbits/sec). To deliver high bit rate service at longer distance, inverse multiplexing (IMX) technology was developed, where the high-bit rate signal is demultiplexed into lower bit rate traffic streams, and low bit rate traffic streams are transmitted over several independent twisted pairs. Thus, IMX transmission of ~50 Mbit/s through 18,000 ft line was achieved using 24 to 48 pairs. Details of this transmission technology are described, for example, in U.S. Pat. No. 6,687,288. IMX technology does not upgrade individual pair performance directly.

The major technical problem limiting wider deployment of broadband services is pair-to-pair interaction in telephone cables. The twisted pair is an open circuit, and interaction of the pair's electromagnetic field with other circuits causes both power attenuation and crosstalk. Two types of crosstalk dominate, far-end crosstalk (FEXT) caused by interaction of traffic downstreams in adjacent pairs, and near-end crosstalk (NEXT), caused by interaction of upstream and downstream traffics. General approach called Dynamic Spectral Management (DSM) was developed to improve performance of individual twisted pairs by managing traffic through several pairs together. The simplest DSM approach is to balance spectral power in adjacent pairs to optimize performance of the whole cable rather than individual pair. An efficient algorithm of Iterative Water Filling [W. Yu, W. Rhee, J. Cioffi and S. Boyd, "Iterative Water-filling for the Vector Multiple Access Channel," ANSI Contribution T1E1.4/2001-200R4, November 2001, Greensboro, N.C.] was developed for power management in multiple DMT systems to equalize signal/noise on the same frequency tones in multiple systems.

Another DSM approach is known as vectoring, or crosstalk-free transmission through twisted pair cables. The general idea of vectoring is to pre-distort the transmitted signal so that by the time the signal reaches the receiver, this pre-distortion is fully compensated by pair-to pair interaction. Complicated transmission environment, with pairs strongly interacting with each other inside the cable, makes vectoring an attractive but technically difficult problem. The cable of n twisted pairs may be presented by a matrix equation [S. Verdu, Multiuser Detection, Cambridge University Press, UK, 1998; G. Ginis and J. M. Cioffi, "Vectored-DMT: A FEXT Canceling Modulation Scheme for Coordinating Users," Proceedings of IEEE International Conference on Communications 2001, Vol. 1, Helsinki, Finland, pp. 305-309, June 2001; J. M. Cioffi, EE 379c textbook, "Digital Transmission Theory, Volume I," http://www.stanford.edu/class/ee379c/]:

$$Y(f) = H(f) \cdot X(f) + N(f) \qquad (1)$$

where H(f) is a n×n matrix of channel transfer functions, X(f) is a "vector" of n inputs, N(f) is noise, and Y(f) is a vector of n channel outputs. Off-diagonal matrix elements of H represent mutual crosstalk between each couple of interacting pairs.

Ideal vectoring is described by the following equation:

$$Z = WY = BX + E \qquad (2)$$

where matrix W causes the channel output Z=WY to appear free of crosstalk with B having all off-diagonal elements equal zero and the error matrix E being "white" noise. Any practical approach to implement the system described by Eq. (2) implies resolving two matrix equations:

$$\begin{pmatrix} Z_1 \\ Z_2 \\ \ldots \\ Z_n \end{pmatrix} = \begin{pmatrix} H_{11} & H_{12} & \ldots & H_{1n} \\ & H_{22} & \ldots & H_{2n} \\ & & \ldots & \ldots \\ & & & H_{nn} \end{pmatrix} \begin{pmatrix} X_1 \\ X_2 \\ \ldots \\ X_n \end{pmatrix} \qquad (3)$$

where matrix elements $W_{ik}$ are defined from the equation:

$$\begin{pmatrix} X_1 \\ X_2 \\ \ldots \\ X_n \end{pmatrix} = \begin{pmatrix} W_{11} & W_{12} & \ldots & W_{1n} \\ & W_{22} & \ldots & W_{2n} \\ & & \ldots & \ldots \\ & & & W_{nn} \end{pmatrix} \begin{pmatrix} Z_1 \\ Z_2 \\ \ldots \\ Z_n \end{pmatrix} \qquad (4)$$

Figure 1:
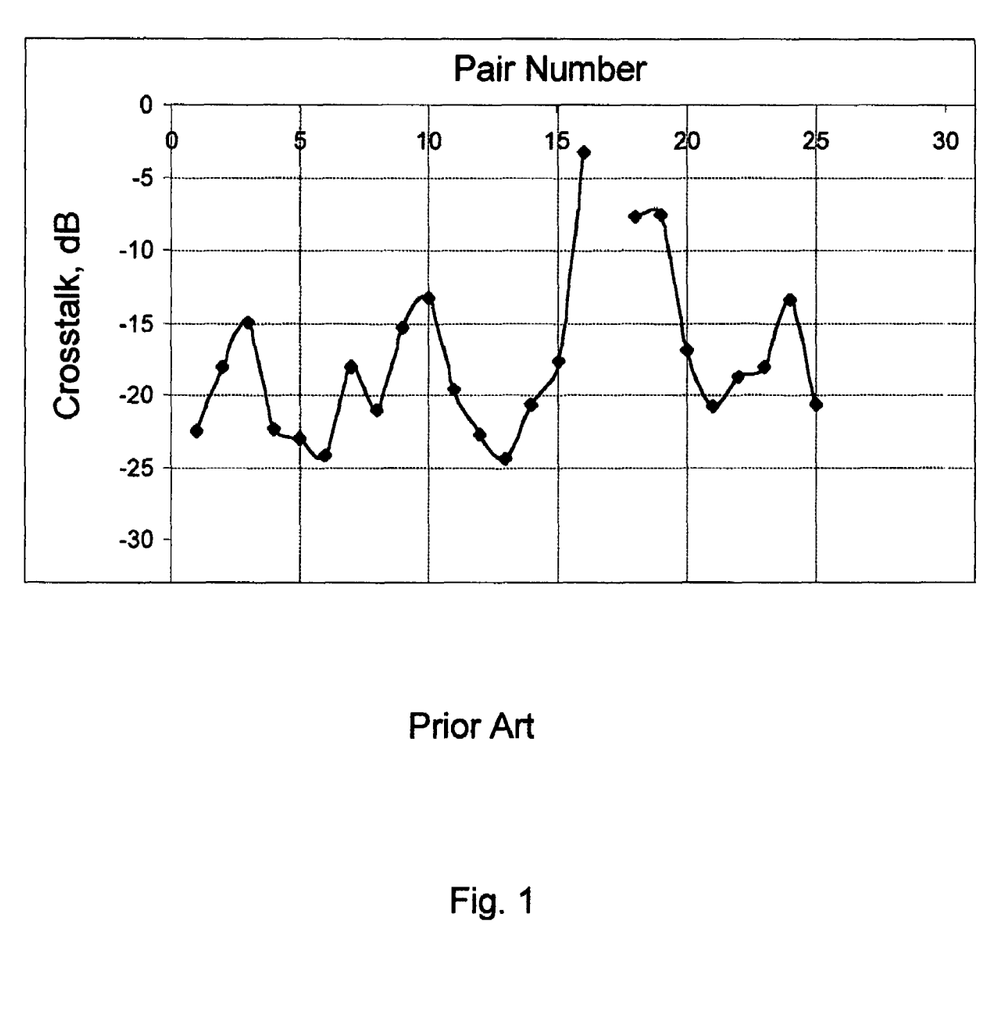
FIG. 1 is a typical graph of pair-to-pair crosstalk in a commercial 25-pair cable. The pair number in the cable is shown on horizontal axis. The relative crosstalk of pair No. 17 with all other 24 pairs is shown on vertical axis. The value +60 dB is added to all crosstalk values.

Eq. (3) and (4) are equivalent to Eq. (1) and (2) without noise contributions. To determine n(n−1)/2 matrix elements $W_{ik}$ for n pairs, equations (3) and (4) should be applied to at least (n−1)/2 vectors X, to provide a complete system of linear equations. If n=10, the system of 45 equations has to be resolved, each matrix element $W_{ik}$ being expressed as a sum of multiple products of matrix elements $H_{ik}$ from Eq. (3). Even if the numerical difficulties are resolved the statistical errors in $H_{ik}$ when transferred into $W_{ik}$ values will accumulate. For reference purposes, FIG. 1 illustrates relative values of averaged crosstalk powers detected in one pair (No. 17 in FIG. 1) of the 25-pair bundle from the surrounding pairs. Obviously, adjacent pairs (No. 16, 18 and 19) give the biggest contributions. However all other pairs, if coincide in phase, give a contribution comparable to pairs 16, 18 or 19. Thus, vectoring of pair No.17 might need mutual consideration of almost all other pairs in the bundle. Within approach of Eq. (3, 4), a system of 276 linear equations with 276 unknown $W_{ik}$ has to be resolved with accuracy determined by real and imaginary parts of many contributions of the type $$\sum_k \prod_{k'} H_{ik} H_{i'k'}.$$

With the values $H_{ik}$ measured at opposite sides of all pairs, with multiple equipment reconnections, reliable definition of $W_{ik}$ looks problematic for any appreciable number of pairs n>>1.

No commercial system based on DSM is available at the present time but some models describing vectoring of small number of pairs (3-4) are mentioned in literature [for example, "Vectoring Techniques for Multi-line 10MDSL Systems", T1E1.4/2002-196 Voyan Technology Contribution to Committee T1—Telecommunications Working Group T1E1.4 (DSL Access), Denver, Colo., Aug. 19-23, 2002]. Calculations demonstrate that vectoring may improve individual pair performance by several times; however, small number of pairs involved and difficulty of practical implementation limit perspectives of this method of vectoring. For these reasons, different iterative procedures were developed [K. W. Cheong, W. J. Choi and J. M. Cioffi, "Multiuser Soft Interference Canceller via Iterative Decoding for DSL Applications," *IEEE Journal on Selected Areas in Communications*, Vol. 19, No. 2, February 2002] to improve performance by averaging crosstalk with many pairs.

None of the approaches discussed above offers vast improvement of broadband transmission via telephone cables by crosstalk reduction. In the present invention, system and method is provided to improve individual pair transmission by canceling crosstalk, using the phenomena of phase conjugation.

SUMMARY OF THE INVENTION

The present invention provides a method of phase conjugated vectoring (PCV) of transmission signals propagating via a plurality of twisted pairs of a telephone cable. The reference signal is propagating from a receiver site via one twisted pair for obtaining a wavefront of PCV reference signal at a transmitter site. PCV antenna bundle is established for each twisted pair. Input transmission signals are scaled by the PCV reference signal for obtaining mutually coherent PCV transmission signals that are propagated via the PCV antenna bundles for receiving a signal in only a corresponding twisted pair at the receiver site. Each PCV antenna bundle comprises a number of the twisted pairs carrying the PCV reference signals above a predetermined power level defined by crosstalk tolerance.

The reference signal is propagating via twisted pairs with propagation time that either does not exceed or exceeds a shortest wavelength period in any twisted pair. If the propagation time exceeds a shortest wavelength period, additional steps are requested.

A plurality of mutually coherent reference signals are propagated from the receiver site, then time delay is measured between all twisted pairs. To define reconstructing parameters, phase delay and amplitude variations are introduced between the respective transmission signals at the transmitter site to obtain a plane wavefront at the receiver site. These parameters are stored in a system memory. Each transmission signal propagating from the transmitter site is scaled by corresponding reconstructing and scaling parameters and funneled to the PCV antenna bundle.

PCV allows for a crosstalk free transmission of signals through telephone cable identified as a non-uniform physical media. PCV is introduced by propagating one reference signal via one twisted pair from the receiver site to the transmitter site, wherein a diverged front of electromagnetic wave presenting the one reference signal is reversed back to the transmitter site. A bundle is defined for each twisted pair for providing a corresponding PCV antenna. An input signal is scaled by the corresponding reversed reference signal for obtaining scaling parameters of mutually coherent transmission signals that are propagating simultaneously from the transmitter site via the PCV antenna bundle for obtaining one receiving signal in one twisted pair at the receiver site.

A system of crosstalk free transmission of signals via a plurality of twisted pairs of a telephone cable between a transmitter and a receiver sites comprises transmission modems connected to the twisted pairs at the transmitter site. Each transmission modem comprises a combining unit for collecting signals from a respective PCV antenna bundle that is coupled to a processing unit for providing parameters for the PCV antenna bundles for each twisted pair. The PCV components bank is coupled to the processing unit for storing parameters of each PCV antenna, wherein the crosstalk free transmission is provided by scaling input signals to corresponding reversed reference signals and applying scaled signals to the respective PCV antenna bundles. The system provides PCV for both asymmetric and symmetric transmission.

BRIEF DESCRIPTION OF THE DRAWINGS

The foregoing aspects and advantages of the present invention will become better understood upon reading the following detailed description and upon reference to the drawings where.

DETAILED DESCRIPTION OF THE INVENTION

Twisted pair cables are physical objects with very low symmetry. Though adjacent pairs stay co-located along the full cable length, and color codes exist to indicate the pair position relative to other pairs, this symmetry may be broken when cables are spliced. Depending on twisting pitch, the pair length may vary from pair to pair. Ambiguous nature of pair-to-pair interaction causes erratic variations of pair's mutual crosstalk.

Figure 2:
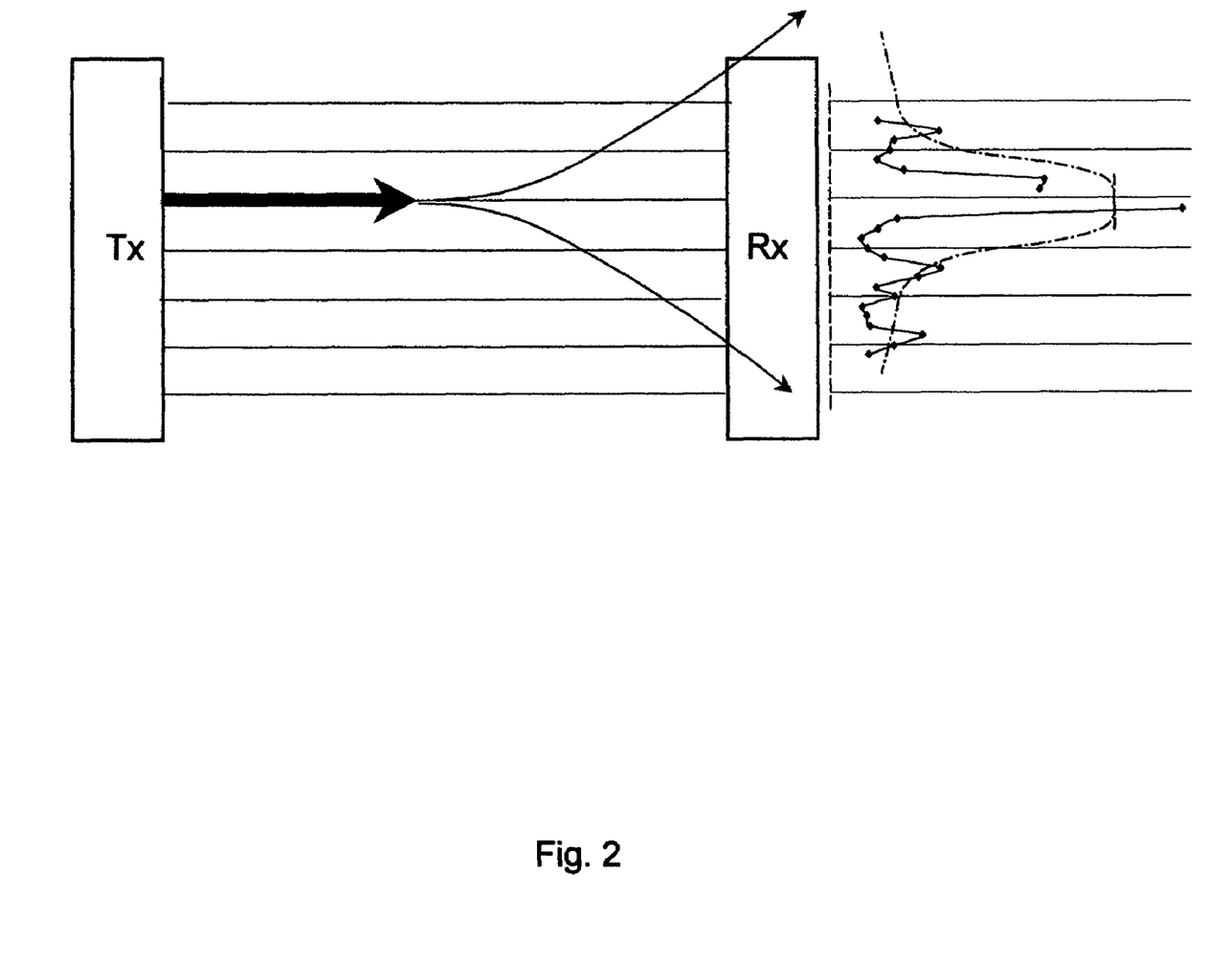
FIG. 2 shows spread of electromagnetic energy propagating from transmitter site Tx to receiver site Rx through the cable of twisted pairs, caused by pair-to-pair crosstalk. Field amplitudes shown in the cable of pairs at site Rx correspond to crosstalk data of FIG. 1.

FIG. 2 illustrates energy spread in the twisted pair cable from the transmitter site (Tx) towards receiver site (Rx). At Tx, energy is concentrated in one pair (thick line extending from transmitter in FIG. 2 shows the tested pair field amplitude), then towards Rx, energy is spread among many pairs. There is no obvious way to establish functional dependence between relative position of pairs and measured crosstalk except tendency of crosstalk decline far from the tested pair. Though each pair may be completely characterized by a set of parameters $H_{ik}$, large cables need so many parameters for characterization that it is preferable to consider cable as a media with random parameters rather than deterministic object.

One of the attributes of wave propagation in random (disordered) media is a phase conjugation phenomenon. When a plane or spherical optical, acoustic etc. wave propagated in disordered media, irregularities of the media distort the wavefront, or wave amplitude and phase distribution at the front of energy and momentum propagation. This distortion is difficult to predict or compensate. However, if the wavefront is inverted, as if the wave is forced to travel backward in time, distorted wavefront returns back as a plane wave or focuses back into the point of the origin. When observed, this phenomenon of wavefront restoration is called phase conjugation. Several physical mechanisms providing phase conjugation are established; for example, nonlinear stimulated scattering processes have been used for phase conjugation of optical waves [B. Ya. Zel'dovich, V. I. Popovichev, V. V. Ragul'skii and F. S. Faizullov. Connection between the wave fronts of the reflected and exciting light in stimulated Mandel'shtam-Brillouin scattering. *Sov. Phys. JETP Lett,* 15:109-115, 1972; R. A. Fisher. *Optical Phase Conjugation.* Academic, San Diego, 1984].

In the present invention, phase conjugation is utilized to develop PCV providing crosstalk-free transmission via the cable of twisted pairs. The idea of phase conjugation in telephone cables is understood as a backward transmission of distribution of signals of FIG. 2 from Rx site to Tx site. When signal presented by electromagnetic wave propagates in a reversed time frame, the diverged front of electromagnetic wave is reversed back to the transmitter site, the energy is concentrated back into the pair where it was emitted from, no matter how complicated the phase relations are between the pairs in the cable, and no energy is detected in any other pair. To implement PCV, specific set of measurements is conducted to characterize the cable, and system is designed to coordinate signal transmission through multiple pairs.

Figure 3:
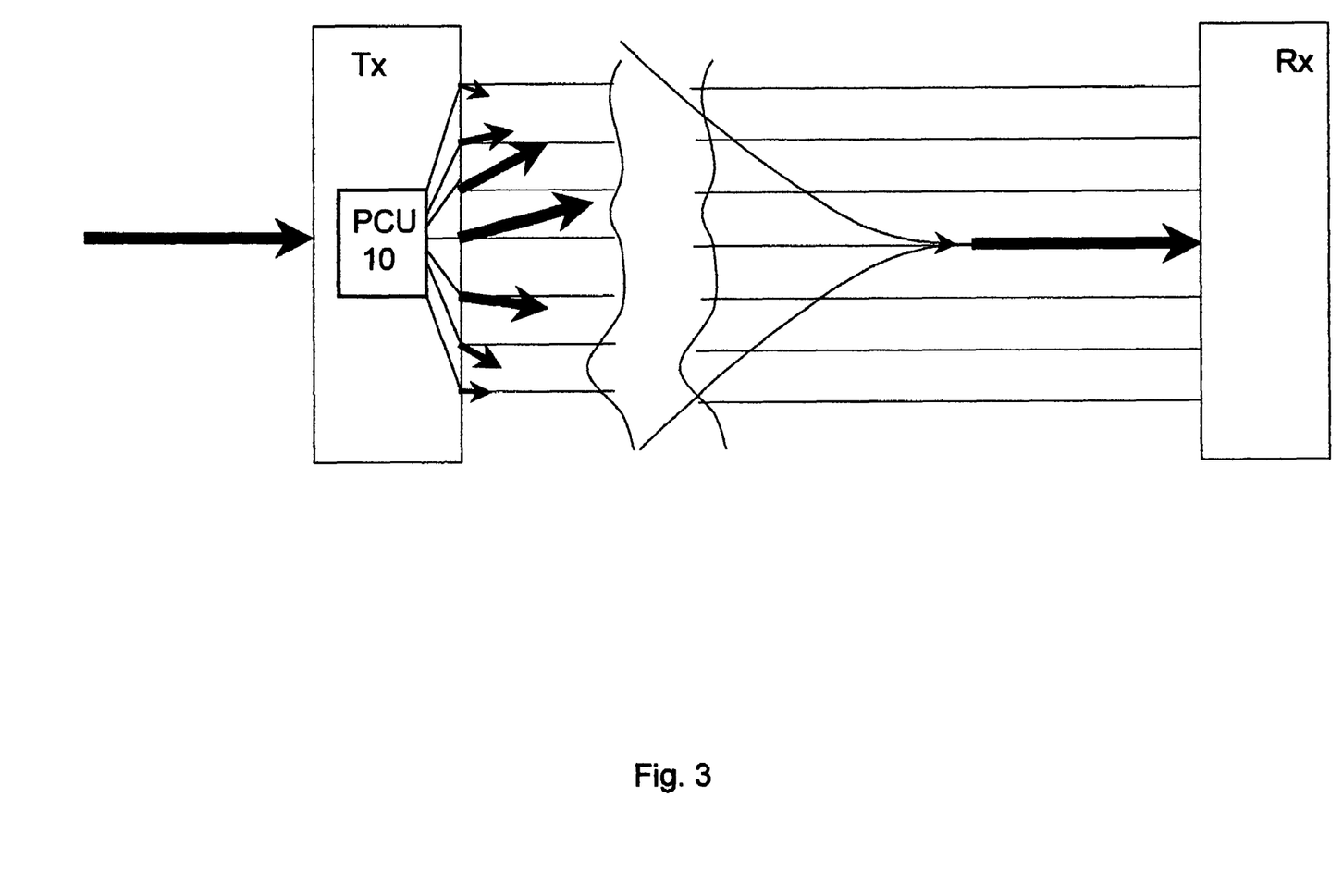
FIG. 3 demonstrates method of PCV transmission in a cable of twisted pairs with phase conjugating unit (PCU) 10.

Phase conjugated transmission implies propagation of mutually coherent waves in different pairs, which makes DMT systems appropriate candidates for this approach. PCV has to be achieved at all transmission frequencies (tones); equipment connected to respective pairs in the cable has to be phase conjugated tone-by tone. General PCV approach is demonstrated in FIG. 3 for one vectored pair where signal $\Omega$ is transmitted through one of the twisted pairs without crosstalk. To detect signal $\Omega$ on the receiver site Rx in this pair only, distribution of amplitudes and phases $\Omega'$ has to be applied to a plurality of pairs in parallel on the transmitter site Tx. To construct $\Omega'$, signal $\Omega$ passes through phase conjugate unit 10, where an array of $\Omega'$ signals is assembled, with appropriate amplitudes and phases. If the array amplitudes and phases $\Omega'$ is conjugated, full $\Omega$ signal will be observed in the original pair on the receiver site. In all other pairs, the signals will be automatically annihilated if phase relations between $\Omega'$ signals correspond to time inversion of the configuration of signal wavefront of FIG. 2. Pairs transmitting $\Omega'$ signals comprise the PCV antenna focusing transmitted signal from many pairs on transmitter site into only one pair on receiver site.

To implement PCV transmission, it is required to reconstruct the wavefront and define PCV antenna bundles. To achieve complete annihilation of the crosstalk all pairs of the cable have to be involved in phase conjugated transmission, with all amplitudes and phases determined exactly. In practical applications, reduction of crosstalk below certain level (set, for example, by thermal noise) does not improve the system performance. Accordingly, the number of required pairs may be reduced, with minimum number of twisted pairs in the bundle determined by tolerated crosstalk level.

The wavefront reconstruction simulates non-disturbed propagation of a plain wave in a random cable. If the real cable is substituted by an ideal uniform cable with $H_{ii}=\lambda_1$, $H_{ik}=\lambda_2$, and equal reference signals are sent from the Tx site through all pairs of the ideal cable, then the signals detected at each pair at the Rx site will also have equal amplitudes and phases by symmetry. In real cables, if the same signal is sent from Tx site through all pairs, all received amplitudes and phases at Rx site are different because of distortion of the wavefront. To restore transmission in the real cable to plane wave propagation conditions, appropriate time delay line is attached to each pair to equalize wavefront traveling time. Both real and imaginary parts of received signals $R_i=r_i \exp(\phi_i)$ in each i-th pair are scaled, for example, to average amplitude $\bar{r}$ and average phase $\bar{\phi}$, and reconstructing parameters are defined for each pair. When equal reference signals are sent through reconstructed cable from Rx site to Tx site, same amplitudes and phases will be detected at each pair on Tx site.

Reconstructed wavefront is defined by only 2n parameters for n-pairs cable. These parameters are stored in system memory and used for definition of PCV antenna outputs.

There is no direct correlation between reconstructing parameters $$\frac{\overline{R}}{R_i}$$

and matrix elements $H_{ik}$ of Eq. (3). If crosstalk is weak, $H_{ik} \ll H_{ii}$, wavefront geometry depends primarily on active resistance and geometrical length of individual pairs, and $$\frac{\overline{R}}{R_i}$$

is defined by ratios $$\frac{H_{ii}}{H_{i'i'}}.$$

PCV transmission also requires definition of PCV antenna bundles. For PCV transmission on i-th pair, reference signal is transmitted backwards from the Rx site in this pair, and amplitude and phase distribution is determined on the Tx site. Respective signals received on the Tx site in each pair are used as a reference signals for PCV antenna. The PCV bundle preferably comprises minimum number of pairs k providing required level of crosstalk cancellation. 2k parameters presenting real and imaginary parts of reference PCV antenna outputs are stored in the system memory per each tone per pair. Minimization of the number of pairs in the PCV bundle reduces requirements for memory and processing power.

In the process of transmission (FIG. 3), each input signal is scaled to the reference signal and phase conjugate unit 10 funnels the scaled signal to the PCV bundle.

If PCV transmission is performed on many pairs, the step of definition of PCV antenna bundles has to be conducted for each pair. PCV antenna bundles for different pairs partially overlap. Transmitted signals dedicated to different PCV pairs are geometrically added at each overlapping PCV antenna pair. For many vectored pairs, the bundle of twisted pairs functions as a multi-element, multi-focus PCV antenna.

For PCV bundles comprising pairs with traveling time difference $\Delta\tau$ less than period of the maximum frequency tone $\omega_{max}$, $$\Delta\tau < \frac{2\pi c}{\omega_{max}}$$

(c is velocity of wave propagation), reconstructing of the wavefront is not needed, and definition of PCV antenna bundle parameters is conducted directly.

In operation, multi-transmitter DMT system processes the input traffic through the following steps.
1. Input bit stream is buffered and encoded in N QAM symbols (N equals number of DMT tones);
2. Each symbol is scaled with the reference symbol stored in the system memory;
3. PCV antenna signals are defined and sent to all pairs of the PCV bundle.
4. PCV antenna signals belonging to different vectored pairs are geometrically summed at each overlapping pair.
5. Symbols corresponding to all PCV antenna signals are IFFT processed in parallel to obtain phase conjugated vectored N time-domain samples;
6. Parallel samples of different tones are converted into a serial format and sent through the transmission line.

The differences between the single transmitter, one-pair treatment of the tone and PCV transmission are the steps 2, 3 and 4 where the multiple PCV antenna signals are assembled and summed for all vectored pairs.

Maximum number of parameters stored in the system memory for each tone in n-pair cable is 2n reconstructing parameters and 2n parameters of PCV antenna With the number of tones>100, it may require substantial memory. However, if these parameters are defined for each 10-th or 15-th tone, other data may be obtained by interpolation between the tones because crosstalk is a relatively smooth function of frequency. As a result, the required memory may be reduced.

The above description relates to compensation of crosstalk of signals propagating in the downstream direction (FEXT). Another pair-to pair crosstalk component is near-end crosstalk (NEXT). To correct for NEXT in multi-pair environment, the NEXT amplitude and phase distributions have to be determined for each pair, and appropriate correction signals applied to upstream traffic, similar to echo canceling.

PCV methodology was disclosed in conjunction with DMT systems. However, similar consideration of mutual coherence of signals in adjacent pairs is applicable to any other linear system with or without dispersion. Those skilled in the art will be able to apply the teaching of this invention to QAM format or other formats where linear expansion of the signals into Fourier series or other equivalent expansions are possible.

Figure 4:
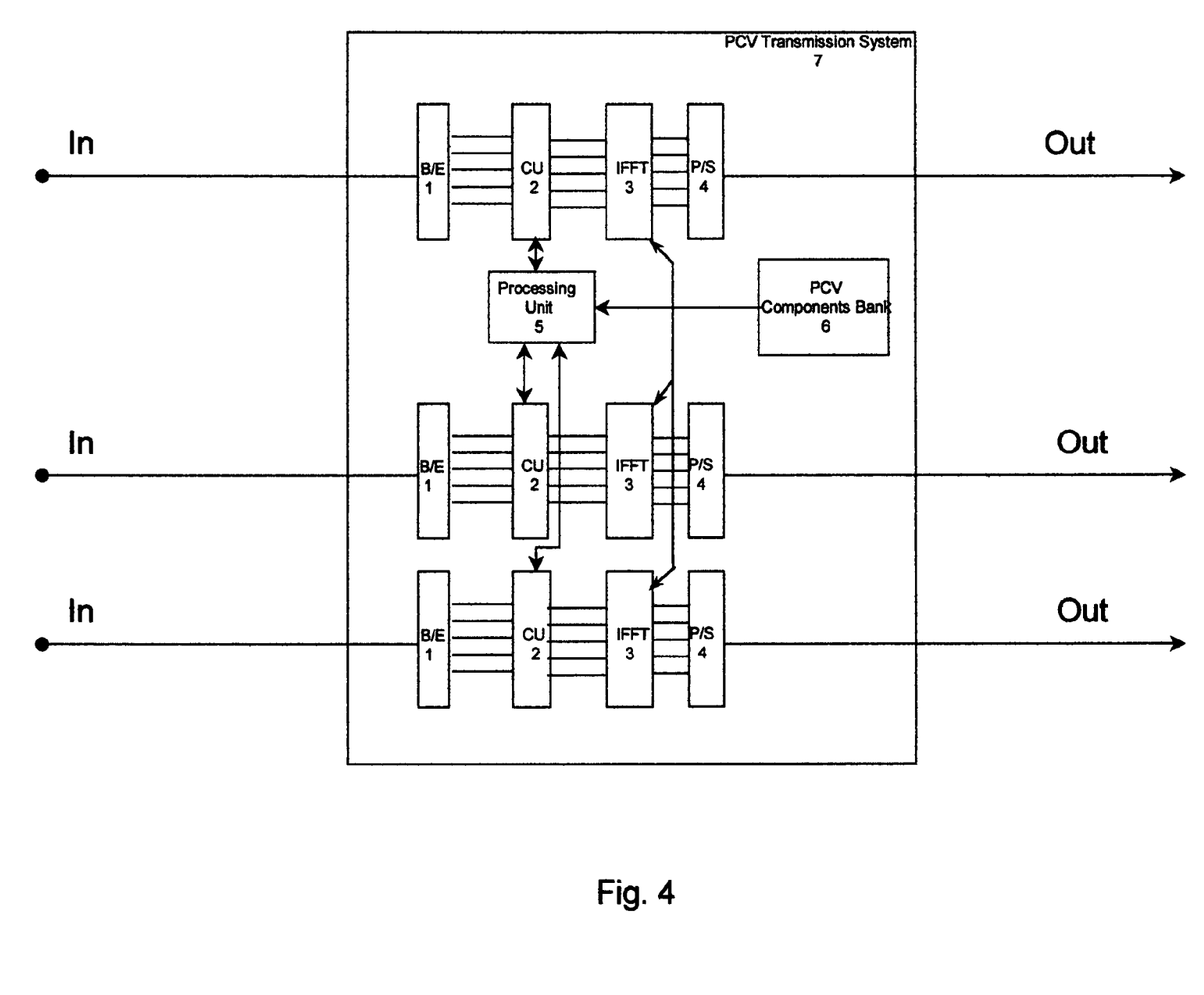
FIG. 4 is a block diagram of an asymmetric PCV system. 1—buffer/encoder B/E, 2—combining unit CU, 3—inverse fast Fourier transform unit IFFT, 4—parallel to serial converter P/S, 5—processing unit, 6—PCV components bank, 7—PCV transmission system.
Figure 5:
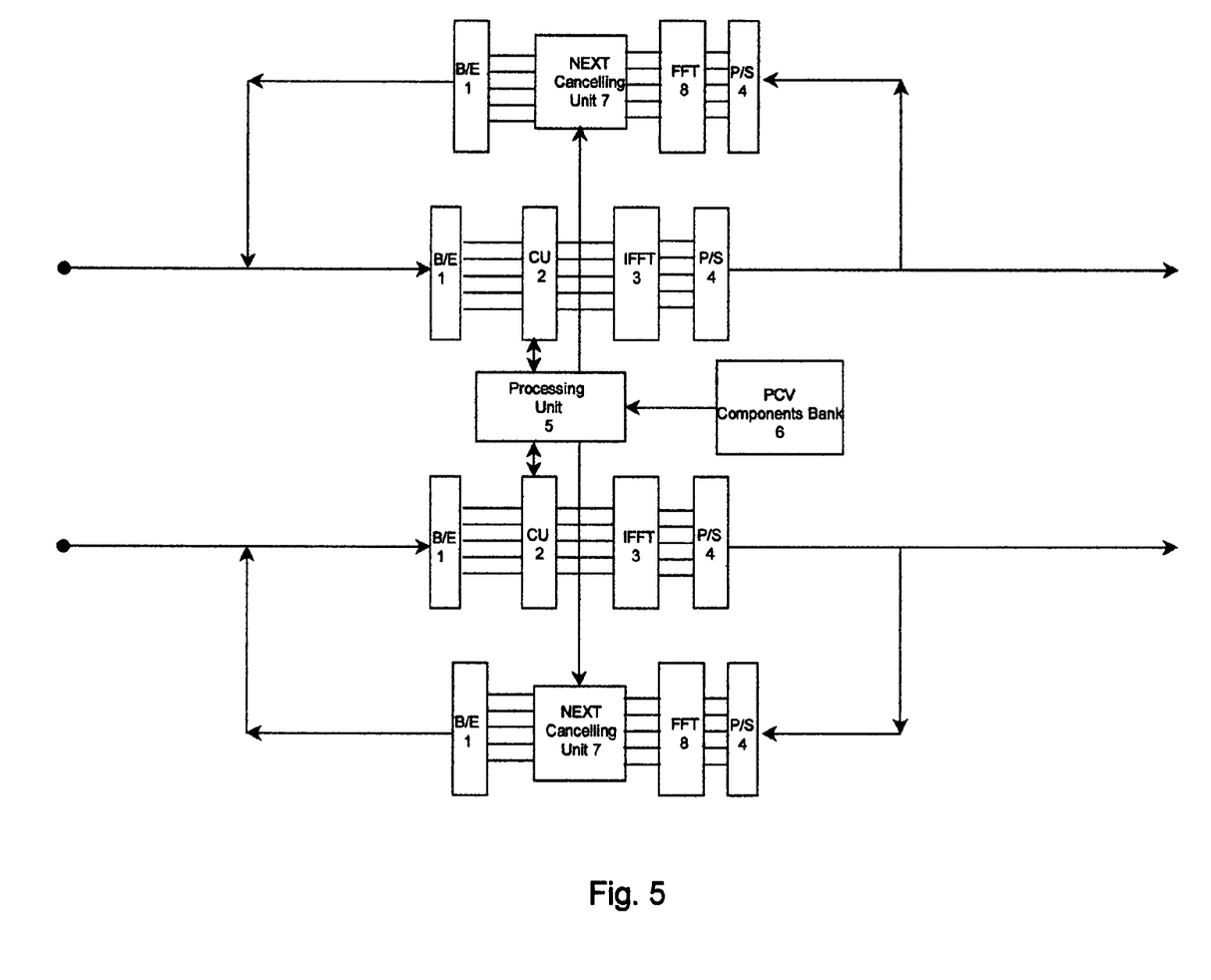
FIG. 5 is a block diagram of a symmetric PCV system, 1—buffer/encoder B/E, 2—combining unit CU, 3—inverse fast Fourier transform unit IFFT, 4—parallel to serial converter P/S, 5—processing unit, 6—PCV components bank, 7—NEXT canceling unit, 8—fast Fourier transform unit FFT.

PCV based systems are shown in FIGS. 4 and 5.

FIG. 4 shows a block-diagram of transmission system 7 performing PCV transmission. All three pairs shown in FIG. 4 are included in the vectoring procedure. Each pair is equipped with transmitting system comprising conventional DMT units: buffer/encoder (B/E) 1, Inverse Fourier Transform unit (IFFT) 3 and parallel-to-serial converter (P/S) 4 (some other circuits, such as digital-to-analog converter and low-pass filter, are not shown in FIG. 4), with a combining unit (CU) 2 inserted between B/E and IFFT units. CU's 2 belonging to all vectored lines have a two-way communication with processing PCV unit 5. CU's 2 report temporal Fourier component values of input traffic acquired by units 1, to PCV unit 5 for distribution among other respective units for assembling PCV antenna signals. To calculate conjugated values of each tone amplitudes and phases, PCV unit 5 operates with values of reconstructing parameters of all pairs involved in PCV bundle, and PCV antenna parameters for each pair. These data are stored in PCV components bank 6. Bank 6 is filled in the system training process.

Frequency domain symbols vectored by units 2 are IFF transformed into time domain samples, converted from parallel to a serial stream by units 4, further converted from digital into analog form and transmitted through respective twisted pairs. All IFFT units are preferably mutually synchronized to simplify the system performance (indicated by arrows connecting real units 3 in FIG. 4).

On the receiving end, conventional signal detection is performed.

In the process of system training for each vectored pair, reference signal is send from the Rx site, and the PCV bundle of pairs required to suppress crosstalk below the noise level is defined.

In FIG. 5, part of the symmetric transmission system is shown implementing the PCV method. Only two vectored pairs are shown; transmission and reception are performed on both pairs. Transmission part is identical to one presented in FIG. 4. Receiver part comprises parallel/serial converter 4, fast Fourier transform (FFT) block 8, buffer/encoder 1, and Near End Crosstalk (NEXT) canceling unit 7. In the training process, bank 6 is filled by NEXT components from all pairs included in the PCV bundle.

If the receiving modems connected to different users are not physically co-located, PCV antenna pairs and NEXT canceling may need establishing local connections between the modems (for example, low-power short range wireless).

The general principles described in this invention, such as selection of bundle of copper pairs for vectoring traffic in one pair, defining PCV bundles and PCV antenna parameters, and providing reconstructing parameters for receiving crosstalk-free signals on the receiving end, is applicable, with modifications known to those skilled in the art, to many different possible configurations of telephone cables and their assemblies, and transmission formats other than DMT.

What is claimed is:

1. A method of phase conjugated vectoring (PCV) of transmission signals propagating via a plurality of twisted pairs of a telephone cable comprising the steps of:
   propagating a reference signal from a receiver site via one twisted pair of said plurality for obtaining a wavefront of PCV reference signal at a transmitter site;
   establishing PCV antenna bundle for each twisted pair of said plurality;
   scaling input transmission signals by said PCV reference signal for obtaining mutually coherent PCV transmission signals; and
   propagating said mutually coherent PCV transmission signals via said PCV antenna bundles for receiving only one signal in a corresponding twisted pair at the receiver site.

2. The method of PCV of transmission signals of claim 1, further comprising measuring a propagation time of said reference signal via said twisted pairs.

3. The method of PCV of transmission signals of claim 2, wherein each said established PCV antenna bundle comprises a number of the twisted pairs carrying said PCV reference signals above a predetermined power level defined by crosstalk tolerance.

4. The method of PCV of transmission signals of claim 3, wherein the propagation time of said reference signal does not exceed a shortest wavelength period in any said twisted pair.

5. The method of PCV of transmission signals of claim 3, wherein the propagation time of said reference signal exceeds a shortest wavelength period in any said twisted pair.

6. The method of PCV of transmission signals of claim 5, further comprising the steps of: reconstructing a wavefront formed by said referenced sign, which comprises:
   propagating a plurality of mutually coherent reference signals from the receiver site;
   measuring time delay between all twisted pairs of said plurality;
   defining reconstructing parameters by introducing phase delay and amplitude variations between the respective transmission signals at the transmitter site to obtain a plane wavefront at the receiver site; and
   storing reconstructing parameters in a system memory.

7. The method of PCV of transmission signals of claim 6, further comprising scaling each said respective transmission signal propagating from the transmitter site by corresponding reconstructing and scaling parameters and funneling each signal to the PCV antenna bundle.

8. A method of crosstalk free transmission of signals through telephone cable having a plurality of twisted pairs between a transmitter site and a receiver site, comprising the steps of:
   identifying the telephone cable as a non-uniform physical media;
   introducing phase conjugation vectoring (PCV) by propagating one reference signal via one twisted pair of said plurality from the receiver site to the transmitter site, wherein a diverged front of electromagnetic wave presenting said one reference signal is reversed back to the transmitter site to said one twisted pair;
   forming a bundle for each twisted pair of said plurality for providing a corresponding phase conjugated vectoring antenna;
   scaling an input signal by the corresponding reversed reference signal for obtaining scaling parameters of mutually coherent transmission signals; and
   propagating simultaneously said mutually coherent transmission signals from the transmitter site via said PCV antenna bundle for obtaining one receiving signal in one said twisted pair at the receiver site.

9. The method of crosstalk free transmission of claim 8, further comprising measuring a propagation time of the reference signal via said twisted pairs.

10. The method of crosstalk free transmission of claim 9, wherein the propagation time of any said reference signal does not exceed a shortest wavelength period of a respective electromagnetic wave propagating in any said twisted pair.

11. The method of crosstalk free transmission of claim 9, wherein the propagation time of any said reference signal exceeds a shortest wavelength period of a respective electromagnetic wave propagating in any said twisted pair.

12. The method of crosstalk free transmission of claim 11, further comprising the steps of:
   propagating a plurality of mutually coherent reference signals from the receiver site;
   measuring distribution of amplitudes and phases of said reference signals at the transmitter site;
   obtaining reconstructing parameters for each twisted pair; and
   scaling the input signal from the transmitter site by said scaling and reconstructing parameters to corresponding reversed reference signal; and
   applying said scaled and reconstructed signals to the respective PCV antennas for obtaining one receiving signal in one said twisted pair at the receiver site.

13. A system of crosstalk free transmission of signals via a plurality of twisted pairs of a telephone cable between a transmitter and a receiver sites, comprising:
   transmission modems connected to the twisted pairs at the transmitter site, said transmission modems comprising combining units for collecting signals from a respective phase conjugate vectoring (PCV) antenna bundle;

a processing unit coupled with each said combining unit for providing parameters for the PCV antenna bundles for each said twisted pair; and a PCV components bank coupled to said processing unit for storing parameters of each said PCV antenna, wherein the crosstalk free transmission is provided by scaling input signals to corresponding reversed reference signals and applying scaled signals to the respective PCV antenna bundles.

14. The system of crosstalk free transmission of claim 13, wherein each said transmission modem further comprising:

a buffer/encoder for encoding a transmission input data, an IFFT unit connected to said buffer/encoder via said combining unit for obtaining Fourier transformed analog data; and parallel-to-serial converter connected to said IFFT unit for conversion of analog data into a waveform transmitted in the respective twisted pair.

15. The system of crosstalk free transmission of claim 14, wherein the transmission input data is propagated from the transmitter site to the receiver site.

16. The system of crosstalk free transmission of claim 13, wherein each said transmission modem further comprising:

a first and a second buffer/encoders for encoding a transmission input data,

IFFT unit connected to said first buffer/encoder via said combining unit for obtaining Fourier transformed analog data;

a first and a second parallel-to-serial converters, said first parallel-to-serial converter connected to said IFFT unit for conversion of analog data into a waveform transmitted in a respective twisted pair;

said second parallel-to-serial converter connected to a Near End Crosstalk (NEXT) canceling unit via a Fast Fourier Transform (FFT) unit for canceling Near End crosstalk, and said NEXT canceling unit connected to the second buffer/encoder.

17. The system of crosstalk free transmission of claim 16, wherein the transmission input data is propagated from the transmitter site to the receiver site.

18. The system of crosstalk free transmission of claim 16, wherein the transmission input data is propagated from the receiver site to the transmitter site.

* * * * *